April 23, 1968  J. H. MITCHELL ETAL  3,379,945
ALTERNATING CURRENT ELECTRIC MOTORS
Filed Nov. 2, 1964  7 Sheets-Sheet 1

INVENTORS
JOHN HENRY MITCHELL
WALTER W. R. SEARLE

INVENTORS
JOHN HENRY MITCHELL
WALTER W. R. SEARLE

United States Patent Office 3,379,945
Patented Apr. 23, 1968

3,379,945
ALTERNATING CURRENT ELECTRIC MOTORS
John Henry Mitchell, Rickmansworth, and Walter William Ralph Searle, Beaconsfield, England, assignors to The Hoover Company, North Canton, Ohio, a corporation of Ohio
Filed Nov. 2, 1964, Ser. No. 408,275
Claims priority, application Great Britain, Nov. 4, 1963, 43,495/63
20 Claims. (Cl. 318—46)

This invention relates to alternating current electric motors, more especially single-phase motors, and an object of the invention is to provide an improved form of motor assembly intended to run at two different working speeds, more especially where the working speeds are widely different.

According to the present invention an alternating current electric motor assembly for driving a driven member, such as a shaft, at two substantially different working speeds, includes two motors both coupled to the driven member, whereof one, referred to as the high-speed motor, which is preferably of series-wound commutator type, is constructed and coupled to the driven member to drive it at its high working speed, whilst the other is an induction motor constructed and coupled to the driven member so that its synchronous speed will correspond to a speed of the driven member in the region of its lower working speed, means for electrically connecting the motors in series, the motors being so designed that the maximum braking torque exerted on the driven member by the induction motor at supersynchronous speeds, added to the minimum load torque, exceeds the driving torque exerted on it by the high-speed motor at the corresponding speed to give a stable lower speed, and switch means for altering the circuit connections so as to remove or reduce the said braking torque to allow the high-speed motor to drive the driven member at its substantially higher working speed. The rotors of the two motors may be mounted on a common shaft to run at the same speed.

A further object of the invention is to provide an economical motor assembly for certain specific requirements in which a driven member has to be driven alternatively at a low speed, for example 50 r.p.m. and at a substantially higher speed, for example 700 r.p.m., without recourse to gears, clutches and the like. It is of course possible to employ two separate motors quite independently and switch off one at one speed and the other at another speed. For example an ordinary series wound commutator motor could be employed at the high speed and switched off at the low speed, whilst at the low speed the drive would be performed by an induction motor which would be switched off at the high speed.

By means of the present invention the series motor, in addition to providing the whole of the power required at high speed, also contributes a useful share of the power required at low speed, and thereby makes it possible to employ an appreciably smaller induction motor than would otherwise be needed. At the same time the impedance of the induction motor results in a reduced voltage, less than that of the supply, being applied to the series motor, and in fact may result in taking from the supply a current which does not vary greatly over the whole speed range of the machine. Accordingly the design of the series motor may be an optimum for the high speed operation and may be such that it would be heavily overloaded if the full supply voltage were applied to it continuously at the low speed. For starting the assembly the series motor will provide a torque at zero speed and it is therefore unnecessary to provide the induction motor with a special starting winding, nor is it essential to provide a centrifugal switch.

In one form of the invention the switch means are arranged to disconnect or short-circuit the induction motor to allow the high-speed motor to operate at its substantially higher working speed.

Under certain conditions such an arrangement may, however, result in applying an excessive torque to the driven member when the switch means are switched over from the low-speed condition to the high-speed condition. A further object of the invention is to overcome this difficulty. Thus in a further form of the invention the switch means are arranged to disconnect portions of the induction motor windings to reduce the braking torque to allow the high speed motor to drive the driven member at its substantially higher working speed. For example they may be arranged to disconnect the pole windings of one polarity so as to reduce the torque produced by a given current without altering the number of poles. In such an arrangement a portion of the induction motor windings remains in series with the high-speed motor in the high-speed condition. At the low speed these windings have appreciable impedance and appreciably reduce the voltage applied to the high speed motor so that the torque exerted by it is less than it would be if the full voltage were applied across it. In addition the remaining windings of the induction motor will cause it to exert a braking torque over a range of supersynchronous speeds, thereby still further reducing the resultant torque exerted on the driven member when the switch means are first switched over to the high-speed condition. The braking torque is however less than the corresponding driving torque of the high-speed motor, so that it does not prevent the latter from continuing to accelerate the driven member. Moreover as the speed rises the braking torque decreases and in addition the impedance of the induction motor decreases so that at the high working speed substantially the whole of the supply voltage is applied to the high speed motor, and the reduction of resultant driving torque caused by leaving part of the induction motor in circuit is acceptably small. Hence there is no necessity to effect any further change in circuit connections.

A further object of the invention is to provide for applications in which it is also a requirement to provide a third or intermediate working speed between the low and high working speeds, for example to drive a driven member at 50, 200 and 700 r.p.m. For such an application the induction motor may be provided with windings for two different numbers of poles to provide the lower and intermediate speeds. For example if the intermediate speed is provided by windings operating the induction motor as a two pole motor, the low speed may be provided by windings operating the motor as an eight pole motor. Since no starting windings are required the two pole and eight pole windings can each be accommodated in slots left vacant by the other.

In such an arrangement it may be difficult to match the torque of a given series motor with that of both the two pole and eight pole arrangements, and a further object of the invention is to meet this difficulty. Accordingly the series motor field may be provided with a tapping, and switch means may be connected to the tapping for matching the torque of the series motor to the braking torque of the induction motor above one of its synchronous speeds.

In the low speed condition it will be appreciated that the starting torque of the high speed motor corresponds to only a portion of the supply voltage. In certain applications, where it is desirable to accelerate the driven parts very rapidly up to a lower working speed, means may be provided for applying a higher voltage to the high speed motor until the assembly reaches a speed somewhat below the low working speed. Accordingly the assembly may include an automatic starter switch, for example a centrifugal switch, arranged to change the circuit connections in such manner as to increase the torque when starting, for example from the circuit condition corresponding to a low working speed to that corresponding to a higher working speed. In particular the starting switch may be arranged to disconnect the induction motor when starting so that the whole supply voltage is applied to the series motor.

Further objects, features, and details of the invention will be apparent from the following description of certain specific embodiments thereof, given by way of example, with reference to the accompanying drawings, in which.

Figure 1:
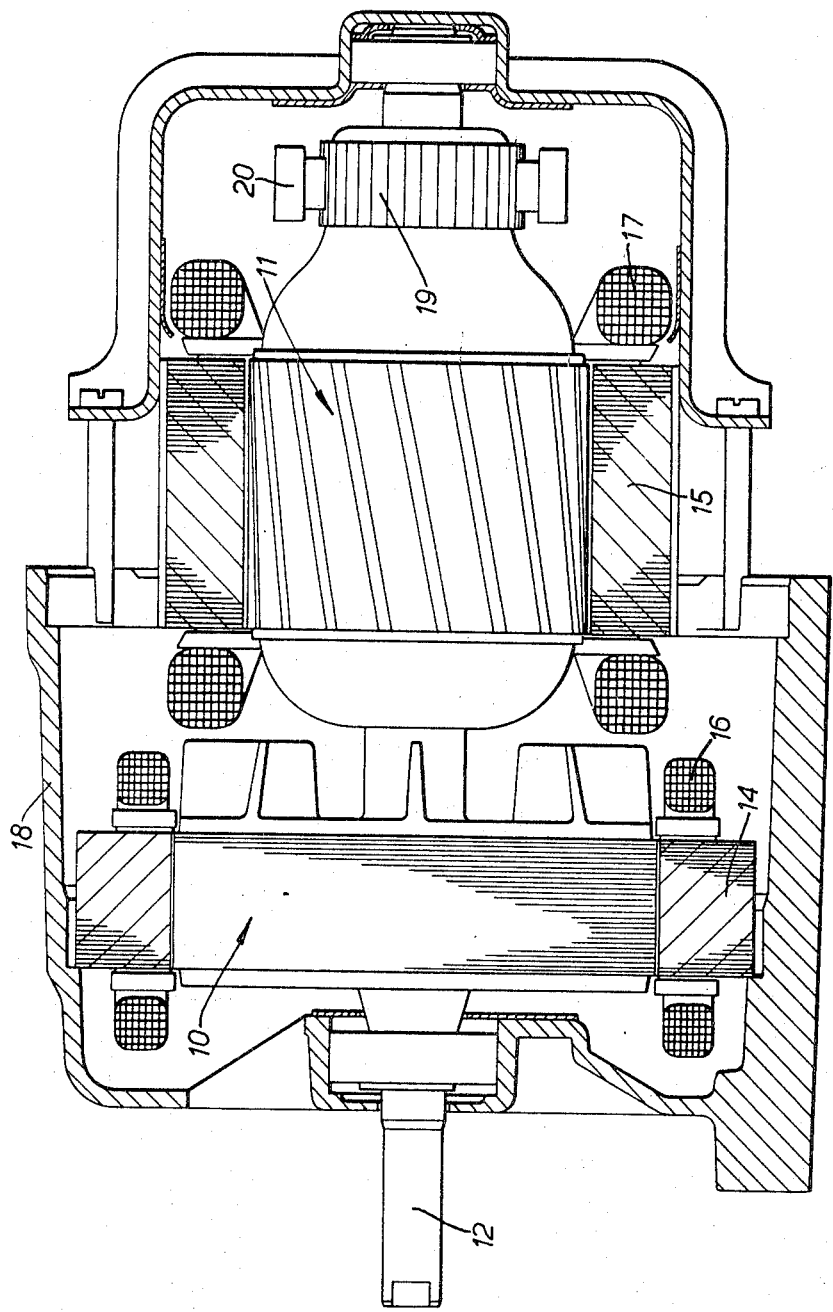
FIGURE 1 is a sectional elevation of a motor assembly embodying the invention.

A motor assembly in accordance with the invention may of course be employed for a wide variety of purposes, but each of the embodiments to be described is in fact primarily intended as the driving means for a washing and spin-drying machine in which certain driven parts such as a rotary container are required to rotate at a lower working speed confined to a narrow speed range about 50 r.p.m., and at a high working speed of about 700 r.p.m. which may vary somewhat in accordance with the characteristic of a series motor. The total power output at the low speed should be of the order of half that at the high speed. In addition it may also be required to provide an intermediate speed in which the driven parts rotate at 200 r.p.m. in which case the arrangement shown in FIGURE 8 or FIGURE 9 may be employed. It is desirable that the speed changes should be effected by electric switching of the motors without recourse to clutches, gears and the like, except means to provide a constant reduction ratio which in the present instance is 15 to 1 from the motor to the container.

In accordance with the present invention the driving assembly comprises a twin motor having two rotors 10 and 11 mounted in tandem on a common shaft 12 but co-operating with separate stator stacks 14 and 15 and windings 16 and 17 in a common casing 18. One rotor 10 is a squirrel cage rotor for co-operating with a single-phase eight pole induction motor stator 14, 16, whilst the other 11 is an armature provided with a commutator 19 and brushes 20 for co-operating with an A.C. commutator type series wound motor stator 15, 17.

In the arrangements of FIGURES 2 to 7 only two speeds are required, and the design of the motors is such that the synchronous speed of the induction motor (750 r.p.m. at 50 cycles per sec.) will be about the low working speed and moreover that above this synchronous speed the maximum braking torque of the induction motor (or at least this braking torque plus the minimum load torque) will be greater than the corresponding driving torque of the series motor when the two are connected in series to the supply.

It is well known that the torque of a single-phase induction motor without starting means is zero at standstill, and, as the speed increases, the torque gradually increases in a driving direction to a maximum at a value somewhat below synchronous speed, whereafter it falls off very rapidly to zero at synchronous speed, after which a braking torque builds up very rapidly to a maximum as the speed is forced above synchronous speed. In the present arrangement, for the low speed, the induction motor is connected in series with the series motor, which modifies the values in question, but the general pattern remains unchanged.

Figure 4:
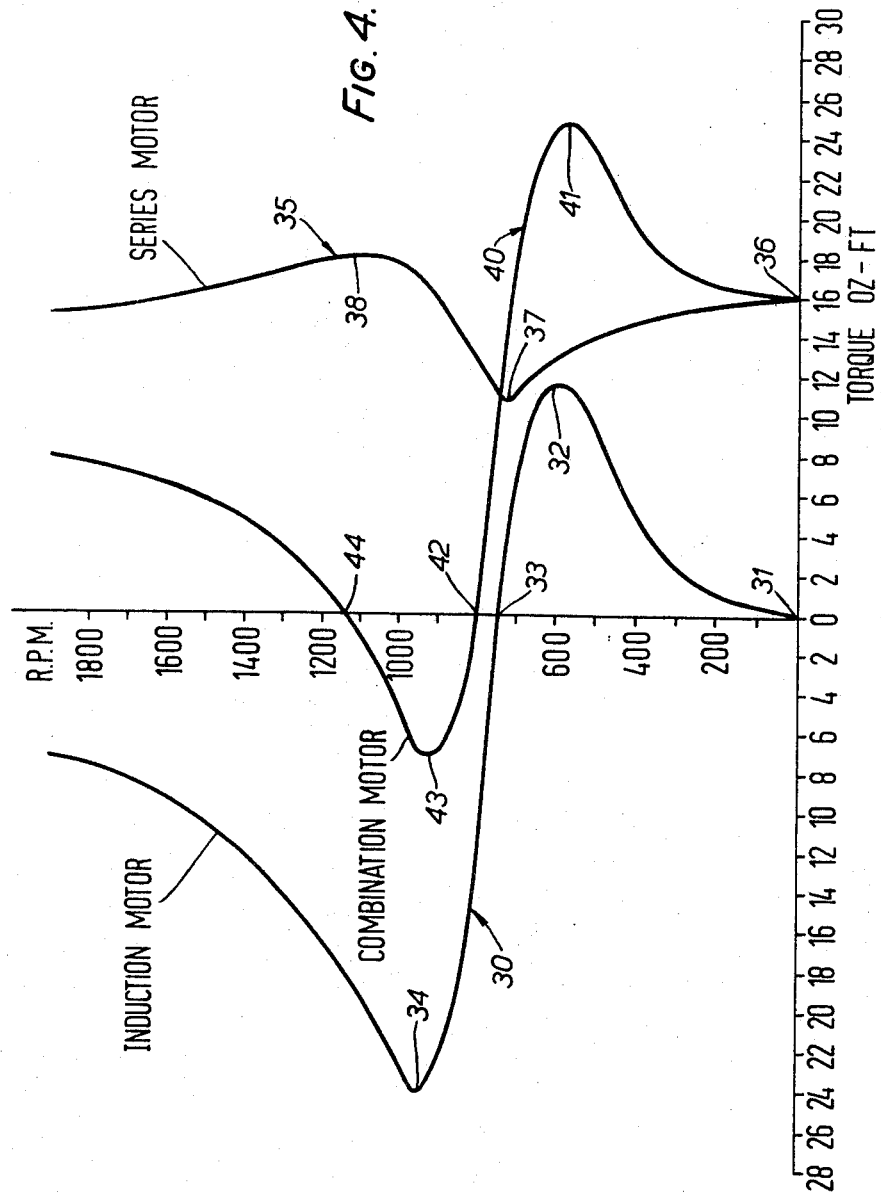
FIGURE 4 is a graph relating torque to speed, over the low-speed range.

Thus in FIGURE 4 the curve 30 represents the variation with speed of the torque exerted by the induction motor when in the low-speed switching position, namely when connected in series with the high-speed motor. From zero at standstill (the point 31) the torque rises to a driving maximum at the point 32, then falls rapidly to zero at the synchronous speed (the point 33) after which it rises rapidly to a braking maximum at the point 34 where the value of the braking torque is substantially greater than that of the maximum driving torque at the point 32.

Figure 5:
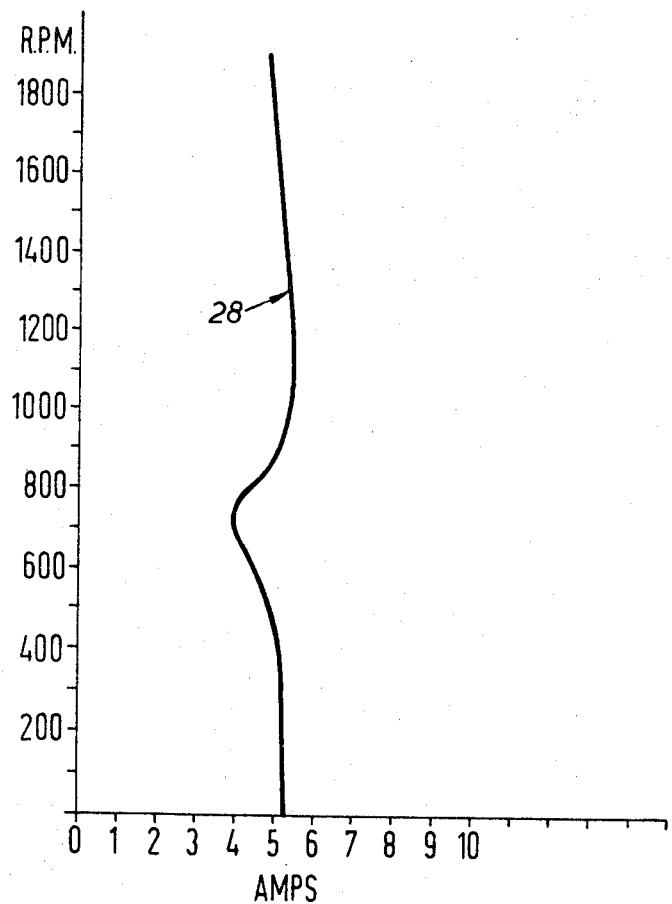
FIGURE 5 is a graph relating current to speed.

In FIGURE 5, the curve 28 indicates the variation with speed of the current taken by the two motors in series. The normal torque curve of a series motor is modified more substantially than that of an induction motor by the fact that the two motors are connected in series, and in the specific embodiment, as shown by the curve 35 of FIGURE 4, the torque of the series motor gradually decreases from standstill (the point 36) to a minimum at the synchronous speed (the point 37) due to the fact that the current is a minimum at this speed, whereafter the torque of the series motor increase again to a maximum value, slightly greater than that at standstill (at the point 38) after which it gradually decreases to the maximum speed.

As already indicated the motors are designed so that the maximum braking torque of the induction motor at supersynchronous speeds, added to the minimum load torque, exceeds the driving torque of the series motor at corresponding speeds. In this specific embodiment the load torque can be practically zero.

The curve 40 represents the combined torque of the two motors and is obtained by adding together the values represented by the curves 30 and 35. Thus the combined torque at standstill is that of the series motor (the point 36). As the speed rises the torque of the series motor falls slightly but that of the induction motor increases substantially so that the combined torque increases considerably to a maximum at a speed somewhat below synchronous speed (the point 41). Thereafter the torque of the series motor continues to decrease and that of the induction motor rapidly decreases so that the combined torque would pass through zero (at the point 42) to a maximum negative value (at the point 43) and would remain negative over a range of supersynchronous speeds (up to the point 44). Accordingly there is a stable working range of speeds around the synchronous value such that even when the load torque collapses to zero the speed is still limited to a value slightly above synchronous speed.

FIGURES 4 and 5 are of course concerned with the low-speed condition, with the two motors connected in series.

Figure 2:
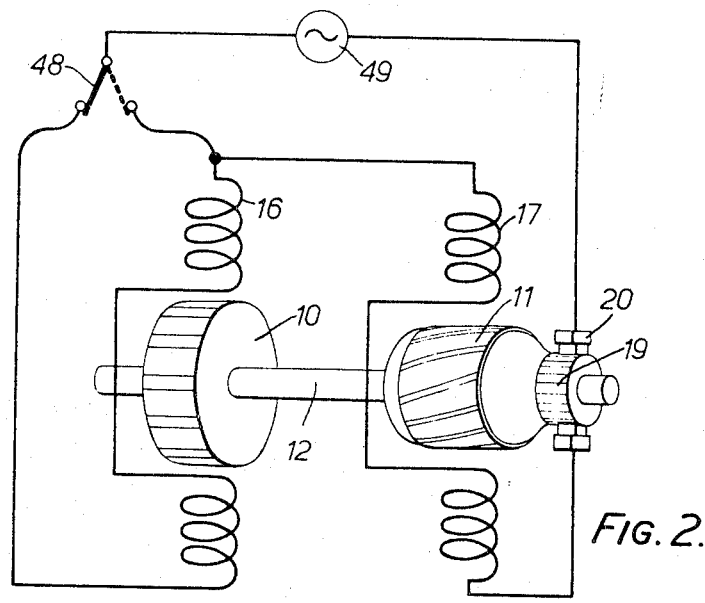
FIGURE 2 is a schematic circuit diagram of one arrangement.

FIGURE 2 shows one way of connecting switch means to change over to the high-speed condition. A two-way switch 48 or the equivalent is arranged so that when it is in the low-speed position shown in full lines it connects the two motors in series across supply terminals 49, whereas when it is moved to the high-speed position shown in dotted lines it cuts out the induction motor and connects the high speed motor direct across the supply. The two-way switch may be replaced by a single pair of contacts arranged to short circuit the induction motor.

Figure 6:
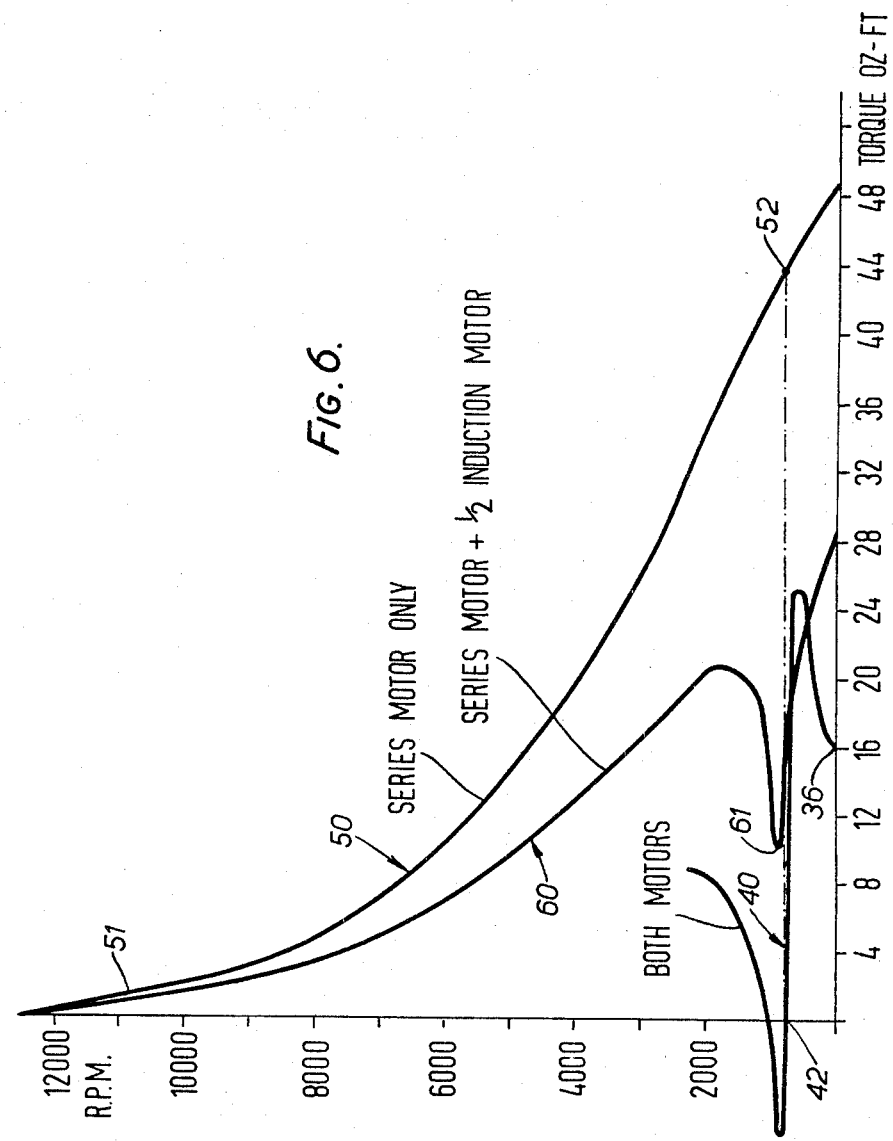
FIGURE 6 is a graph relating torque to speed over the whole speed range.

FIGURE 6 shows the speed torque curves of the combined motor in both the high-speed and low-speed conditions. Thus as indicated by the curve 50, which is the ordinary curve of a conventional series wound commutator motor, in the high-speed condition with the full supply voltage connected across the high-speed motor it will run up to a high working speed in the region of the point 51, which may be about fourteen times the low working speed, in the region of the point 42.

The arrangement described can be designed to fulfill the requirements set out in an economical manner and to provide at the lower working speed an output about half the power output at the higher speed. The starting torque at standstill is provided by the series motor and it is unnecessary to provide the induction motor with a starting winding or with a centrifugal switch for disconnecting a starting winding.

In some applications, with the arrangement shown in FIGURE 2 and operating in accordance with the curve 50 of FIGURE 6, the initial torque when changing from the low-speed condition to the high-speed condition may be excessive. In particular in the case of a washing and spin-drying machine the sudden acceleration when changing from a low tumbling speed to the switching condition required for a high spinning speed may have certain disadvantages. Thus where the rotary container is mounted in a fixed casing carried by a sprung suspension the change may result in a sideways jolt of the suspended system which may be objectionable. In addition the acceleration may be so rapid that clothes lying in a bundle at the bottom of a horizontal axis container, tumbling at low-speed, may have no opportunity of distributing themselves round the periphery as the container speeds up to spinning speed.

For these or other reasons, it may be desirable to reduce the initial torque represented by the point 52 of the curve 50, when changing from the low-speed to the high-speed condition, which it will be seen is nearly three times the starting torque at the point 36 in the low-speed condition, or indeed to reduce the starting torque in the high-speed condition if the motor is liable to be started from rest in the high-speed condition. In this case the arrangement shown in FIGURE 3 may be adopted, for which the high-speed torque characteristic is shown by the curve 60 in FIGURE 6.

Figure 3:
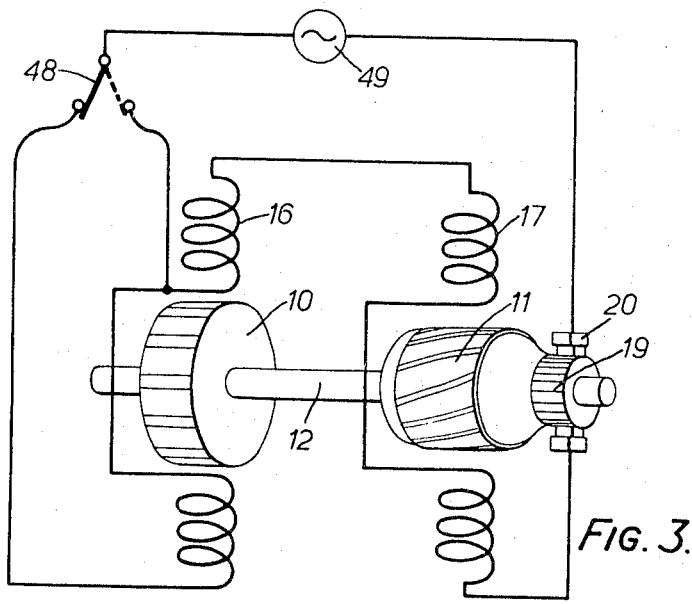
FIGURE 3 is a schematic circuit diagram of another arrangement.

It will be seen that FIGURE 3 is the same as FIGURE 2 (and it is thought unnecessary to desire it in more detail) except that in the high-speed position only part of the induction motor winding 16 is cut out, the remainder remaining in series with the high-speed motor windings 17.

This may be effected in various ways, for example by making each of the pole windings 16 of the induction motor in two sections and providing switch contacts to cut out one section of each in the high-speed condition. A very simple, and preferred, arrangement is, however, to connect alternate windings (those of the north poles at a particular instant) in series in one group, and the remaining pole windings (of the south poles) in series in another group, and arrange the switch so that in the low-speed position both groups are in series whereas in the high-speed position one group is cut out and the other group remains in series witht he high-speed motor.

The effect of this will be that in the high-speed condition the induction motor will have the same number of poles as in the low-speed condition, but the effective number of turns of each pole winding will be halved.

In connection with FIGURE 4 it will be recalled that the reason why, in the low-speed condition, the speed never rose above the point 42 in the region of the synchronous speed, was that, over the range from the point 42 to the point 44, the braking torque of the induction motor would exceed the driving torque of the high-speed motor. If the braking torque were reduced so that this condition failed to be fulfilled the speed would continue to rise. This in effect is what is done in the arrangement of FIGURE 3, but of course only in the high-speed condition.

Thus in FIGURE 6 the curve 60 is similar to the curve 40 but represents the low-torque condition with the high-speed motor in series with only part of the windings of the eight-pole induction motor. On this curve it will be seen that the torque falls to a minimum at the point 61 in the region of the synchronous speed but unlike the curve 40 it does not have a region where the torque is negative, so that as soon as the circuit is switched to this condition the speed will rise and will continue to rise above the synchronous speed.

At the same time comparing the curves 50 and 60 it will be seen that in the region of the synchronous speed the torque of the latter is considerably less than that of the former. Thus under working conditions in the low-speed condition (curve 40) the torque might be of the order of 10 oz.-ft. Using the curve 50 this would jump to four or five times as much on switching over to the high-speed condition. Using the curve 60 on the other hand the jump would be very much less.

On the other hand above the synchronous speed the torque rises substantially and this may in practice be of value in accelerating the parts rapidly through a critical speed range.

A further advantage, somewhat unexpected, of the arrangement of FIGURE 3, is that the inclusion of the induction motor does not interfere unduly with high-speed operation and it is not necessary to provide any means for cutting it out of the circuit as the speed rises.

Figure 7:
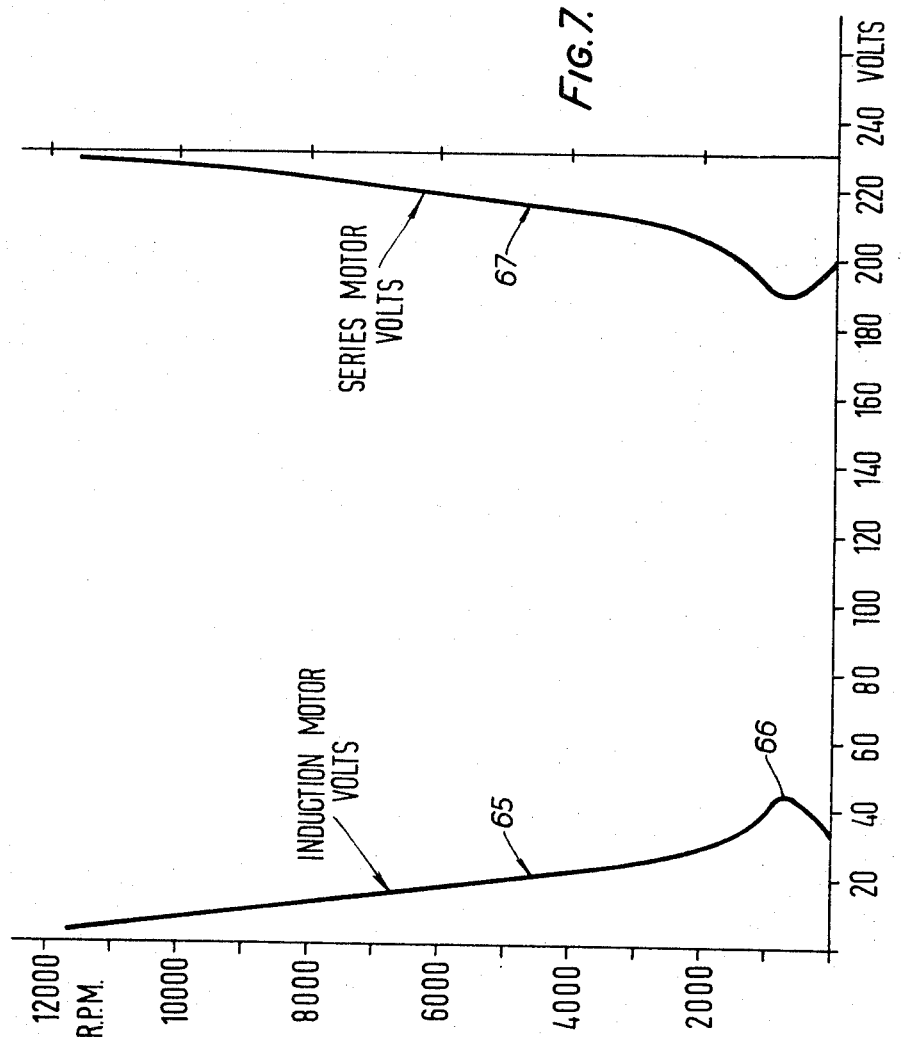
FIGURE 7 is a graph relating voltage to speed.

Thus at low speeds the impedance of the induction motor, even with reduced turns, is substantial. In FIGURE 7 the curve 65 shows the proportion of a supply voltage of 230 volts taken by the induction motor. At the point 66 its share of the supply voltage is about 44 volts. On the other hand at speeds above 8000 r.p.m. its share of the voltage is less than 10 volts and even this is not in phase with that of the high-speed motor so that the voltage of the latter only falls short of the supply voltage by something less than 6 volts, as indicated by the curve 67.

Figure 8:
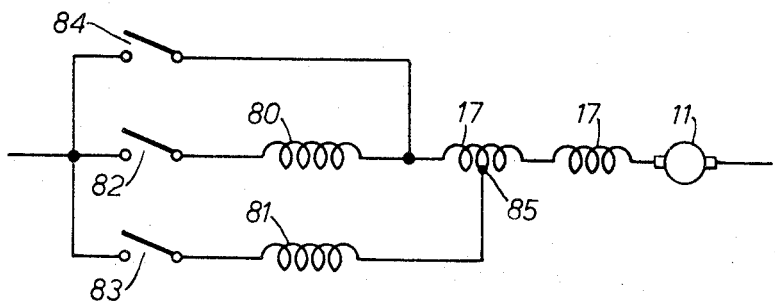
FIGURE 8 is a circuit diagram of an arrangement giving three speed ranges.

FIGURE 8 shows an arrangement for use when it is a requirement that a third working speed should be provided. The induction motor stator is provided with two sets of windings, one set of windings 80 giving eight poles for the low speed and the other set 81 giving two poles for intermediate speed. Since no starter windings are required both the eight-pole winding and the two-pole winding can be accommodated in the slots of a conventional stator. Low, intermediate and high speed contacts 82, 83 and 84 are arranged to include the eight-pole windings, the two-pole windings, or neither.

The arrangement and connection of the eight-pole winding is as already described in connection with FIGURE 2. If, however, the two-pole winding were connected in series with the high-speed motor designed for use with the eight-pole winding, then at the synchronous speed of the former the high-speed motor might take too large a share of the voltage so that its torque would not readily be balanced by the braking torque of a two-pole winding of conventional design. Accordingly the field winding 17 of the high-speed motor may be provided with a tapping 85, this tapping being connected to the two-pole winding 81 so that when the supply is connected to the two-pole winding and disconnected from the eight-pole winding the current passes through the two-pole winding, a portion of the field winding of the high-speed motor, and the armature of the latter. By this means it is possible to satisfactorily balance the high-speed motor with both the eight-pole winding and the two-pole winding.

As indicated above the high-speed series motor provides a starting torque and it is unnecessary to provide starting windings on the induction motor. On the other hand for certain requirements, for example to accelerate driven parts rapidly through critical speed ranges, it may sometimes be desirable to provide a starting torque higher than that corresponding to the series motor connected across the supply in series with the induction motor. Accordingly the machine may be provided with a centrifugal switch arranged to disconnect the induction motor winding and connect the supply directly across the series motor from standstill up to a speed approaching the lower working speed or the intermediate working speed. The series motor may thus be made to provide a high torque for starting, which would greatly overload it if continued indefinitely.

In the three-speed arrangement the centrifugal switch may be connected to give increased starting torque on one speed range (say the intermediate speed) or on each speed range. With two windings on the induction motor stator it is desirable that neither should be short-circuited when the other is operative.

Figure 9:
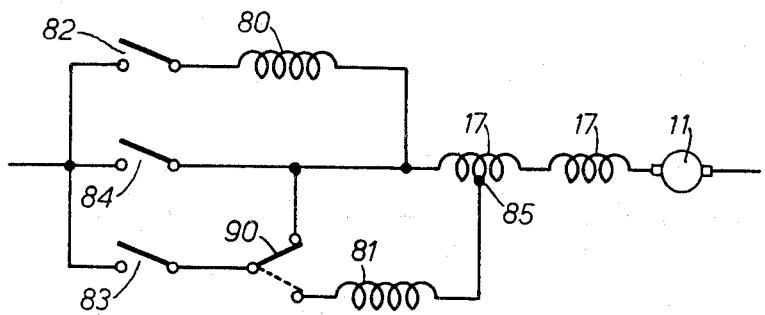
FIGURE 9 is a circuit diagram of another arrangement giving three speed ranges.

Thus one arrangement, shown in FIGURE 9, giving increased torque on the intermediate speed range, is similar to that of FIGURE 8 except that the intermediate speed range contacts 83 connect one terminal of the supply to the common contact of a two-way centrifugal switch 90, which at low speeds connects it to the corresponding terminal of the series motor, and above a speed slightly below the intermediate working speed connects it through the two-pole winding to the tapping of the series motor.

For increased starting torque on both low and intermediate speed ranges the centrifugal switch must of course change over below the lower working speed.

In fact it will be appreciated that many permutations of switching are possible. Thus looking at FIGURE 6 it is seen that there are a number of alternative speed-torque curves available, including the curve 50 for the high-speed motor connected direct across the supply, the curve 40 for the high-speed motor in series with the eight-pole induction motor, and the curve 60 for the high-speed motor in series with part of the windings of the eight-pole induction motor. Two further curves could be drawn for the high-speed motor in series with the whole or part of the two-pole induction motor. Broadly speaking either manually controlled contacts or speed responsive contacts may be provided for switching from any one to any other of these or similar characteristics.

It will of course also be appreciated that additional switch contacts may be provided in accordance with requirements to perform other functions. In particular in the specific embodiment described it may be desirable to reverse the direction of rotation of the container at intervals when washing but not when spinning. For this purpose the high-speed motor armature may be provided with reversing contacts controlled by the low-speed contacts and actuated by a timer, so as to reverse the high-speed motor at regular intervals when in the low-speed condition but not in the high-speed condition. The operation of the induction motor will of course be independent of its direction of rotation so that no provision is required to change its connections.

Whilst certain embodiments of the invention have been described which are primarily intended for a washing machine it will be appreciated that the invention is capable of many other industrial, commercial and domestic applications, for example to industrial centrifuges, or multi-speed drilling machines.

What we claim as our invention and desire to secure by Letters Patent is:

1. An alternating current electric motor assembly for driving a driven member, at two substantially different working speeds, including two motors both coupled to the driven member, whereof one, referred to as the high-speed motor, is constructed and coupled to the driven member to drive it at its high working speed, whilst the other is an induction motor constructed and coupled to the driven member so that its synchronous speed will correspond to a speed of the driven member in the region of its lower working speed, means for electrically connecting the motors in series, the motors being so designed that the maximum braking torque exerted on the driven member by the induction motor at supersynchronous speeds, added to the minimum load torque, exceeds the driving torque exerted on it by the high-speed motor at the corresponding speed to give a stable lower speed, and switch means for altering the circuit connections so as to remove or reduce the said braking torque to allow the high-speed motor to drive the driven member at its substantially higher working speed.

2. A single-phase alternating current electric motor assembly for driving a driven member, at two substantially different working speeds, including two motors both coupled to the driven member whereof one, referred to as the high-speed motor, is of series wound commutator type and is constructed and coupled to the driven member to drive it at its high working speed, whilst the other is an induction motor constructed and coupled to the driven member so that its synchronous speed will correspond to a speed of the driven member in the region of its lower working speed, means for electrically connecting the motors in series, the motors being so designed that the maximum braking torque exerted on the driven member by the induction motor at supersynchronous speeds, added to the minimum load torque, exceeds the driving torque exerted on it by the high speed motor at the corresponding speed to give a stable lower speed, and switch means for altering the circuit connections so as to remove or reduce the said braking torque to allow the high-speed motor to drive the driven member at its substantially higher working speed.

3. A motor assembly as claimed in claim 2 in which the switch means are arranged to disconnect or short-circuit the induction motor to allow the high-speed motor to operate at its substantially higher working speed.

4. A motor assembly as claimed in claim 1 in which the switch means are arranged to disconnect portions of the induction motor windings to reduce the braking torque to allow the high speed motor to drive the driven member at its substantially higher working speed.

5. A motor assembly as claimed in claim 4 in which the switch means are arranged to disconnect the pole windings of one polarity so as to reduce the torque produced by a given current without altering the number of poles.

6. A motor assembly as claimed in claim 1 in which the rotors of the two motors are mounted on a common shaft to run at the same speed.

7. A motor assembly as claimed in claim 1 for running at three different speeds in which the induction motor has windings for two different numbers of poles for the lower and intermediate speeds.

8. A motor assembly as claimed in claim 7 in which the windings for one number of poles occupy slots which would normally be occupied by starting windings for the other number of poles.

9. A motor assembly as claimed in claim 7 including switch means connected to a tapping of the series motor field for matching its torque to the braking torque of the induction motor above one of its synchronous speeds.

10. A motor assembly as claimed in claim 1 including an automatic starter arranged to change the circuit connections in such a manner as to increase the torque when starting.

11. A motor assembly as claimed in claim 10 in which the starter switch is arranged to change the circuit condition from that corresponding to a low working speed to that corresponding to a higher working speed.

12. A motor assembly as claimed in claim 11 in which the starter switch is arranged to disconnect the induction motor so that the whole supply voltage is applied to the series motor when starting.

13. A single-phase alternating current electric motor assembly for driving a driven member, such as a shaft, at two substantially different working speeds, including two motors both coupled to the driven member whereof one, referred to as the high-speed motor, is of series-wound commutator type and is constructed and coupled to the driven member to drive it at its high working speed, whilst the other is an induction motor constructed and coupled to the driven member so that its synchronous speed will correspond to a speed of the driven member in the region of its lower working speed, means for electrically connecting the motors in series, the motors being so designed that the maximum braking torque exerted on the driven member by the induction motor at super-synchronous speeds, added to the minimum load torque, exceeds the driving torque exerted on it by the high-speed motor at the corresponding speed to give a stable lower speed, and switch means arranged to disconnect parts of the induction motor windings while leaving other parts in series with the high speed motor so as to remove or reduce the said braking torque to allow the high-speed motor to drive the driven member at its substantially higher working speed.

14. A motor assembly as claimed in claim 13 in which the rotors of the two motors are mounted on a common shaft to run at the same speed.

15. A motor assembly as claimed in claim 13 for running at three different speeds in which the induction motor has windings for two different numbers of poles for the lower and intermediate speeds.

16. A motor assembly as claimed in claim 15 including switch means connected to a tapping of the series motor field for matching its torque to the braking torque of the induction motor above one of its synchronous speeds.

17. A motor assembly as claimed in claim 13 including an automatic starter switch arranged to change the circuit connections in such a manner as to increase the torque when starting.

18. A motor assembly as claimed in claim 17 in which the starter switch is arranged to change the circuit condition from that corresponding to a low working speed to that corresponding to a higher working speed.

19. A motor assembly as claimed in claim 18 in which the starter switch is arranged to disconnect the induction motor so that the whole supply voltage is applied to the series motor when starting.

20. A motor assembly as claimed in claim 13 in which the high-speed motor is provided with a reversing switch controlled by the switching means and actuated by a timer, to reverse its direction of rotation at regular intervals, when in one speed condition but not in another.

No references cited.

ORIS L. RADER, *Primary Examiner.*

T. E. LYNCH, *Assistant Examiner.*